United States Patent [19]
Reber et al.

[11] Patent Number: 5,995,105
[45] Date of Patent: *Nov. 30, 1999

[54] METHODS AND SYSTEMS FOR PROVIDING A RESOURCE IN AN ELECTRONIC NETWORK

[75] Inventors: William L. Reber, Schaumburg, Ill.; Cary D. Perttunen, Shelby Township, Mich.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/726,004

[22] Filed: Oct. 4, 1996

[51] Int. Cl.[6] .................................................. G06F 15/00
[52] U.S. Cl. ...................... 345/356; 345/335; 707/513; 395/200.47
[58] Field of Search ..................................... 345/326, 348, 345/352, 356, 357, 334, 335, 329; 707/1, 2, 102, 103, 517, 501, 513; 395/200.47, 200.48, 20.49, 200.59

[56] References Cited

U.S. PATENT DOCUMENTS

| | | | |
|---|---|---|---|
| 5,541,394 | 7/1996 | Kouchi et al. | 235/375 |
| 5,619,639 | 4/1997 | Mast | 345/326 |
| 5,629,739 | 5/1997 | Youman et al. | 348/7 |
| 5,640,193 | 6/1997 | Wellner | 348/7 |
| 5,675,733 | 10/1997 | Williams | 395/200.01 |
| 5,692,073 | 11/1997 | Cass | 382/219 |
| 5,710,886 | 1/1998 | Christensen et al. | 395/214 |
| 5,749,075 | 5/1998 | Toader et al. | 705/14 |
| 5,804,803 | 9/1998 | Cragun et al. | 235/375 |
| 5,866,888 | 2/1999 | Bravman et al. | 235/375 |
| 5,895,477 | 4/1999 | Orr et al. | 707/517 |

*Primary Examiner*—Ba Huynh
*Attorney, Agent, or Firm*—James E. Gauger

[57] ABSTRACT

A method of providing a resource in an electronic network (20) which includes receiving a signal associated with machine-readable data (16) read from a network navigation device (10). The network navigation device (10) has a human-viewable image (14). The method further includes identifying the resource based upon the signal, and communicating content of the resource. The method can be performed by a node (24) of the electronic network (20).

10 Claims, 7 Drawing Sheets

METHODS AND SYSTEMS FOR PROVIDING A RESOURCE IN AN ELECTRONIC NETWORK

RELATED INVENTION

The present invention is a continuation-in-part of the following invention which is assigned to the same assignee as the present invention:

"Electronic Network Navigation Device and Method for Linking to an Electronic Address Therewith", having Docket No. MNE00487 and Ser. No. 08/710,820, filed Sep. 23, 1996.

The subject matter of the above-identified related inventions is hereby incorporated by reference into the disclosure of this invention.

FIELD OF THE INVENTION

The present invention relates to methods and systems for providing a resource in an electronic network.

BACKGROUND OF THE INVENTION

The introductory chapter of *Discover the World Wide Web with Your Sportster,* Second Edition, provides a commentary on the present state of the Internet and the World Wide Web. In this reference, it is stated that the Internet is in need of an application which will transform the "much-hyped but difficult-to-use linking of computers around the world to being a highly informative, highly usable database and communications tool." It is further stated that the various available Web browsers (e.g. Mosaic and Netscape Navigator) all have difficulties and limitations which make them insufficient to handle the complexity of the Internet.

Part of the problem is in the complexity of addressing a resource on the World Wide Web. The World Wide Web uses an addressing system known as a URL (Uniform Resource Locator) that defines the location of a resource on the Internet. URLs are comprised of up to four parts: a protocol, a domain name, a path, and a filename. The combination of these four parts can produce a complex address for a resource. For example, the address for information on two-way pagers on the Motorola home page is: http://www.mot.com/MIMS/MSPG/Products/Two-way/tango/desc.html.

Another part of the problem is in the rapid increase of the number of entities and the number of resources on the World Wide Web. Many entities are finding that domain names which they desire are already reserved. As a result, some entities have to purchase their desired domain name from another holder, or have to reserve a less than desirable domain name. Further, as the number of resources increases, newly-formed URLs become less intuitive and greater in length.

Resolving the problem of address complexity becomes even more important as various companies propose Internet navigation systems for the masses. Accordingly, there is a need for an improved method and system for providing a resource in an electronic network.

BRIEF DESCRIPTION OF THE DRAWINGS

The invention is pointed out with particularity in the appended claims. However, other features of the invention will become more apparent and the invention may be best understood by referring to the following detailed description in conjunction with the accompanying drawings in which:

DETAILED DESCRIPTION OF THE PREFERRED EMBODIMENTS

Embodiments of the present invention advantageously provide methods and systems for automatically linking a user to a resource in an electronic network using a network navigation device. The device includes a human-viewable image intuitively associated with the resource and machine-readable data for navigating to the electronic address. A user accesses the resource by reading the machine-readable data using a data reader rather than by typing an electronic address. As a result, the addressing format and the address itself become more transparent to the user. Consequently, the problem of address complexity is addressed and the criticality of reserving desired domain names is reduced.

The device is well-suited for utilization by the masses to navigate to desired locations on the Internet and the World Wide Web. Additionally, a usage parameter associated with the network navigation device can be monitored so that a predetermined measure of use is provided. Consequently, embodiments of the present invention are well suited for limited, prepaid use.

Figure 1:
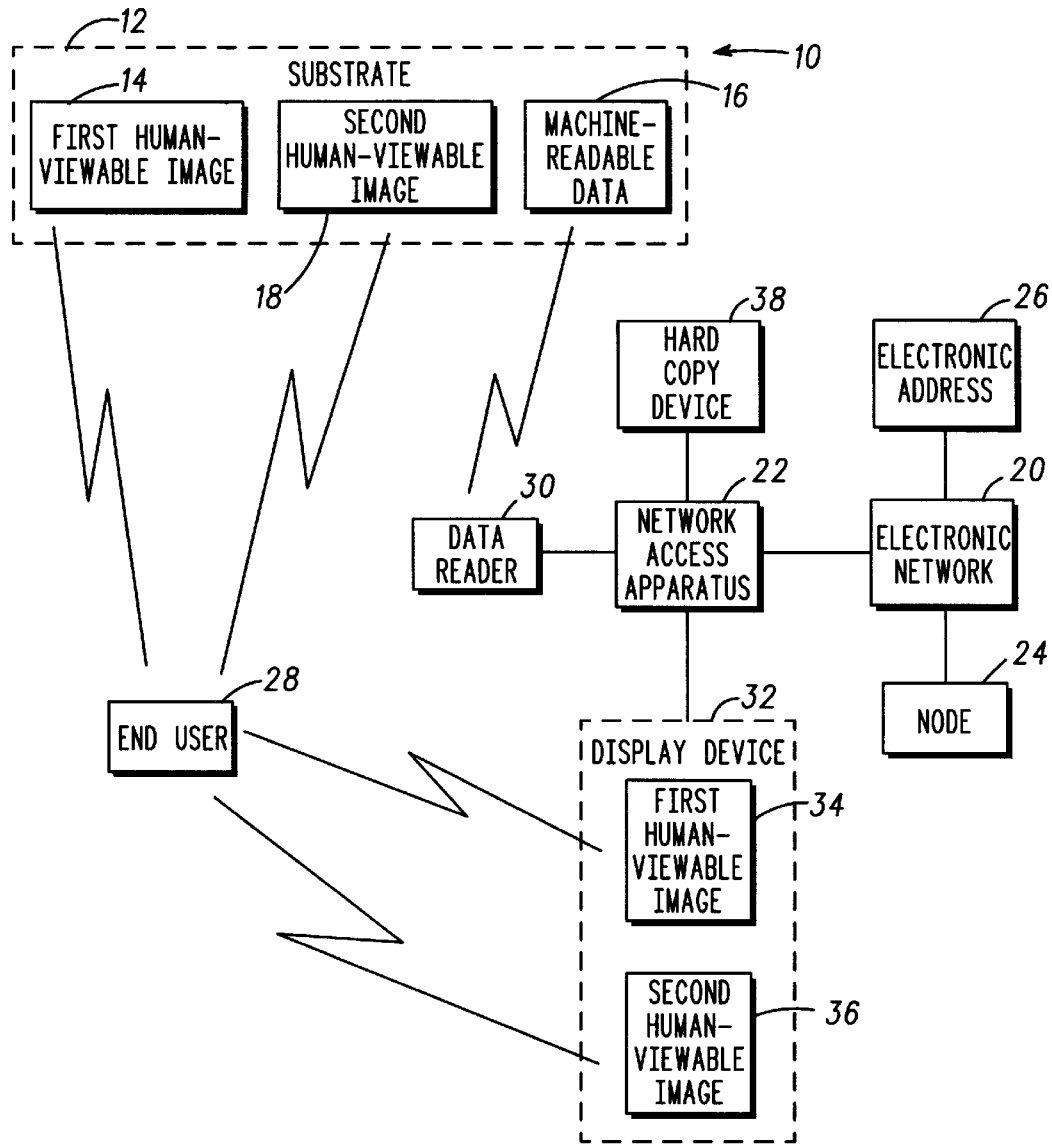
FIG. 1 is a block diagram of an embodiment of a network navigation device in accordance with the present invention.

FIG. 1 is a block diagram of an embodiment of a network navigation device 10 in accordance with the present invention. The network navigation device 10 comprises a substrate 12, a first human-viewable image 14 supported by the substrate 12, and machine-readable data 16 supported by the substrate 12. Optionally, the network navigation device further comprises a second human-viewable image 18 supported by the substrate 12.

The first human-viewable image 14 is indicative of a resource in an electronic network 20. The second human-viewable image 18 is indicative of a service which provides the resource to a network access apparatus 22 via the electronic network 20. The machine-readable data 16 provides data which identifies the resource to the service.

The service which provides the resource to an end user 28 is provided by a node 24 in the electronic network 20. In general, the resource can be locally present at the node 24 or can be at another electronic address 26 in the electronic network 20. Further, the node 24 can include a mirror server to provide resources found elsewhere on the electronic network 20.

Although embodiments of the present invention can be advantageously utilized for any electronic network having an electronic addressing scheme for identifying servers and information contained therein, of particular interest are embodiments of the present invention where the electronic network 20 includes the Internet, the World Wide Web, or an intranet. In this case, the machine-readable data 16 can include at least a portion of a URL or an IP (Internet Protocol) address to identify the resource. Alternatively, the machine-readable data 16 can include a code from which the node 24 identifies the resource.

Preferably, the substrate 12 is formed by a substantially flat piece of material. Examples of materials which can be utilized to form the substrate 12 include, but are not limited to, dielectric materials such as paper, cardboard, and plastic, and substantially nonmagnetic materials. Preferably, the material and its thickness are selected so that the substrate 12 is stiff, yet flexible. It is noted that, in general, the substrate 12 need not be homogeneous, i.e. more than two materials can be utilized to form the substrate 12.

It is also preferred that the substrate 12 be shaped and sized to facilitate ease in handling by individuals, such as the end user 28. For this purpose, the substrate 12 can be card-shaped. For example, the substrate 12 can have the size of a business card, a credit card, an index card, a trading card (e.g. a baseball card), or a playing card (e.g. from a deck of playing cards). In other embodiments, the substrate 12 includes a page in a book, a magazine, a newspaper, or other printed publication. In general, the substrate 12 can have various shapes, such as rectangular, circular, oval, or polygonal shapes, and can have various sizes.

It is further noted that the substrate 12 can be folded or attached to a page which is folded. As a result, the network navigation device 10 can assume two profiles: (i) an unfolded profile which provides surface areas for supporting all of the machine-readable data 16, the human-viewable images 14 and 18, and additional information; and (ii) a smaller, folded profile which provides smaller externally-accessible surfaces for supporting a subset of the above-described information.

The human-viewable images 14 and 18 can be supported by the substrate 12 in a variety of ways. In one embodiment, the human-viewable images 14 and 18 are printed directly onto the substrate 12. In another embodiment, the human-viewable images 14 and 18 are printed onto a second substrate for affixing or adhering to a surface of the substrate 12. Here, for example, the second substrate can have an adhesive backing for affixing the human-viewable images 14 and 18 to the substrate 12. As another alternative, the human-viewable images 14 and 18 can be contained (e.g. sandwiched) within the substrate 12.

The first human-viewable image 14 can include textual information and/or graphical information which provides an intuitive and/or understandable representation of the resource. As an example, to provide a network navigation device for the Motorola Web page on two-way pagers, the human-viewable image 14 can include textual information such as "Motorola" and/or "Two-Way Pagers", graphical information such as an image or an illustration of a Motorola two-way pager, or a combination of textual information and graphical information. Such a human-viewable image is more intuitive and more understandable to the end user 28 than an electronic address having the form of http://www.mot.com/MIMS/MSPG/Products/Two-way/tango/desc.html.

The second human-viewable image 18 can include textual information and/or graphical information which indicates to the end user 28 which service is providing the resource. For example, the second human-viewable image 18 can include textual information such as "Brought to you by" and the name of the service, graphical information such as a logo for the service, or a combination of textual information and graphical information.

Generally, the second human-viewable image 18 can indicate any combination of: a client routine (e.g. an Internet browser routine) which is utilized to display the resource, a network provider (e.g. an Internet service provider) which connects the network access apparatus 22 to the electronic network 20, and a service which provides a link to the resource.

The machine-readable data 16 can be supported by the substrate 12 in a variety of ways. In embodiments where the machine-readable data 16 includes printed data, the machine-readable data 16 can be printed directly onto the substrate 12, printed onto a second substrate for affixing or adhering to a surface of the substrate 12, or can be contained within the substrate 12. In these embodiments, the printed data can include a bar code, such as a one-dimensional or a two-dimensional bar code, representative of the navigation instructions. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, Data Matrix and PDF417.

Typically, the printed data is not readily interpretable or not readily discernible by the end user 28. For example, although a human may be specially trained to mentally decode a bar code, such a code is practically indiscernible by most humans. Further, the printed data can be either visible or invisible to the end user 28.

In embodiments where the machine-readable data 16 includes magnetically-stored data, the machine-readable data 16 can be: (i) stored directly onto a portion of the substrate 12 having a magnetic storage medium; (ii) stored onto a magnetic storage medium for affixing to the substrate 12; or (iii) stored onto a magnetic storage medium contained (e.g. sandwiched) within the substrate 12.

In embodiments where the machine-readable data 16 includes electronically-stored data, the machine-readable data 16 can be stored in a memory device integrated with the substrate 12. In these embodiments, the electronically-stored data can be externally accessed via an interface integrated with the network navigation device 10, or via a transmitter integrated with the network navigation device 10.

The machine-readable data 16 is communicated to the network access apparatus 22 by a data reader 30. The form of the data reader 30 is dependent upon the form of the machine-readable data 16. For printed data, the data reader 30 can include an optical imaging reader such as a scanning wand, a linear CCD (charge coupled device) reader, or a two-dimensional CCD reader. For magnetically-stored data the data reader 30 can include a magnetic read head, such as those within a magnetic stripe reader. For electronically-stored data, the data reader 30 can include an electronic interface or a receiver.

Generally, the machine-readable data 16 can include instructions which directs the network access apparatus 22 to execute any combination of: a predetermined client routine (e.g. a predetermined Internet browser routine), a predetermined network provider access routine (e.g. dialing and logging on to a predetermined service provider), and navigation instructions for automatically linking the network access apparatus 22 to the electronic address 26 via the electronic network 20.

The network access apparatus 22 can have a variety of forms, including but not limited to, a general purpose computer, a network computer, a network television, an internet television, and a portable wireless device. A display device 32, such as a monitor or a television, is coupled to the network access apparatus 22 to communicate visual content of the resource upon linking to the electronic address 20. To reinforce the intuitive association between the network navigation device 10 and the resource, a first image 34 viewable on the display device 32 upon linking to the resource is similar to (or can be equivalent to) at least a portion of the first human-viewable image 14. To reinforce the intuitive association between the network navigation device 10 and the service which provides the resource, a second image 36 viewable on the display device 32 is similar to (or can be equivalent to) at least a portion of the second human-viewable image 18.

The network access apparatus 22 can communicate with a hard copy device 38 to provide a hard copy representation of an experience provided by the network navigation device 10. The hard copy device 38 can have a variety of forms, including but not limited to, a printer, a laser printer, an ink jet printer, a thermal printer, and a plotter.

The hard copy representation allows the end user 28 to retrace his/her experience or navigation session initiated by the network navigation device 10. The hard copy representation can include at least a portion of the content from one or more resources accessed during the experience. Here, for example, the hard copy representation can include a plurality of images in a gallery form which summarize the experience. Alternatively, or in addition thereto, the hard copy representation can include a map which summarizes the electronic addresses visited during the experience.

If desired, the hard copy device 38 can print the hard copy representation onto the substrate 12, or onto another substrate which can be attached to the substrate 12. As a result, a souvenir of the navigation session is physically linked to the network navigation device 10 which initiated the navigation session.

FIG. 2 and FIGS. 4 to 7 illustrate various examples of embodiments of the network navigation device 10. It is noted that the teachings herein can be interchanged and combined among the various examples to form additional embodiments.

Figure 2:
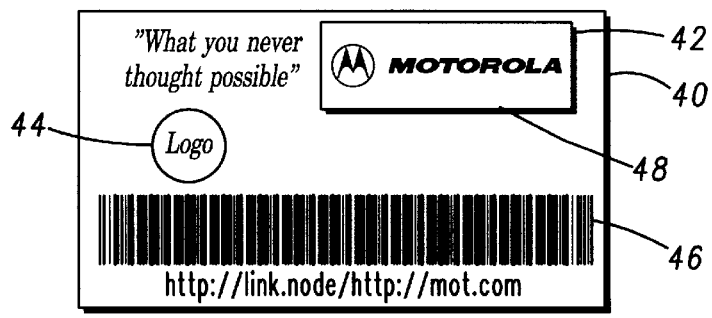
FIG. 2 is an illustration of a first embodiment of a network navigation device in accordance with the present invention.

FIG. 2 is an illustration of a first embodiment of a network navigation device in accordance with the present invention. The network navigation device includes a substrate 40 which supports a first human-viewable image 42, a second human-viewable image 44, and machine-readable data 46.

The first human-viewable image 42 includes information which indicates to an end user that the network navigation device can be utilized to link to a resource from or about Motorola, Inc. For this purpose, included in the human-viewable image 42 are textual information such as "Motorola" and the "What you never thought possible" trademark, and graphical information such as the Motorola logo 48.

The second human-viewable image 44 includes a logo which identifies a service which provides the resource to the end user. In this embodiment, the logo identifies a linking service provided at a node (such as the node 24 in FIG. 1) on the World Wide Web.

The machine-readable data 46 includes a bar code representation of a first URL for the node which provides the linking service (in particular, http://link.node/), and a second URL for the Motorola home page on the World Wide Web (in particular, http://mot.com). It is noted that the URL of http://link.node/ is a fictitious URL, and is utilized for purposes of illustration only.

The first URL provides a navigation instruction for automatically linking the network access apparatus 22 to the node 24 via the electronic network 20. The second URL is utilized to link the node 24 to the Motorola home page (for example, at the electronic address 26) via the electronic network 20. The node 24 receives content from the Motorola home page upon linking thereto. The content is transferred from the node 24 to the network access apparatus 22 via the electronic network 20.

Optionally, the content delivered to the network access apparatus 22 can be modified at the node 24 to include an image corresponding to at least a portion of the second human-viewable image 44. Here, for example, the content can be modified to include an image of the logo for the linking service.

In the embodiment illustrated in FIG. 2, the substrate 40 has the size of a business card (3.5 inches by 2 inches). Preferably, the substrate 40 is formed entirely of a dielectric and/or nonmagnetic material such as paper, cardboard, or plastic. These materials are advantageous for producing a network navigation device which is inexpensive, and hence, can be disposed after use.

The human-viewable images 42 and 44 and the machine-readable data 46 can be printed directly onto the substrate 40. Alternatively, the human-viewable images 42 and 44 and the machine-readable data 46 can be printed onto a second substrate, which is thereafter affixed to the substrate 40.

Figure 3:
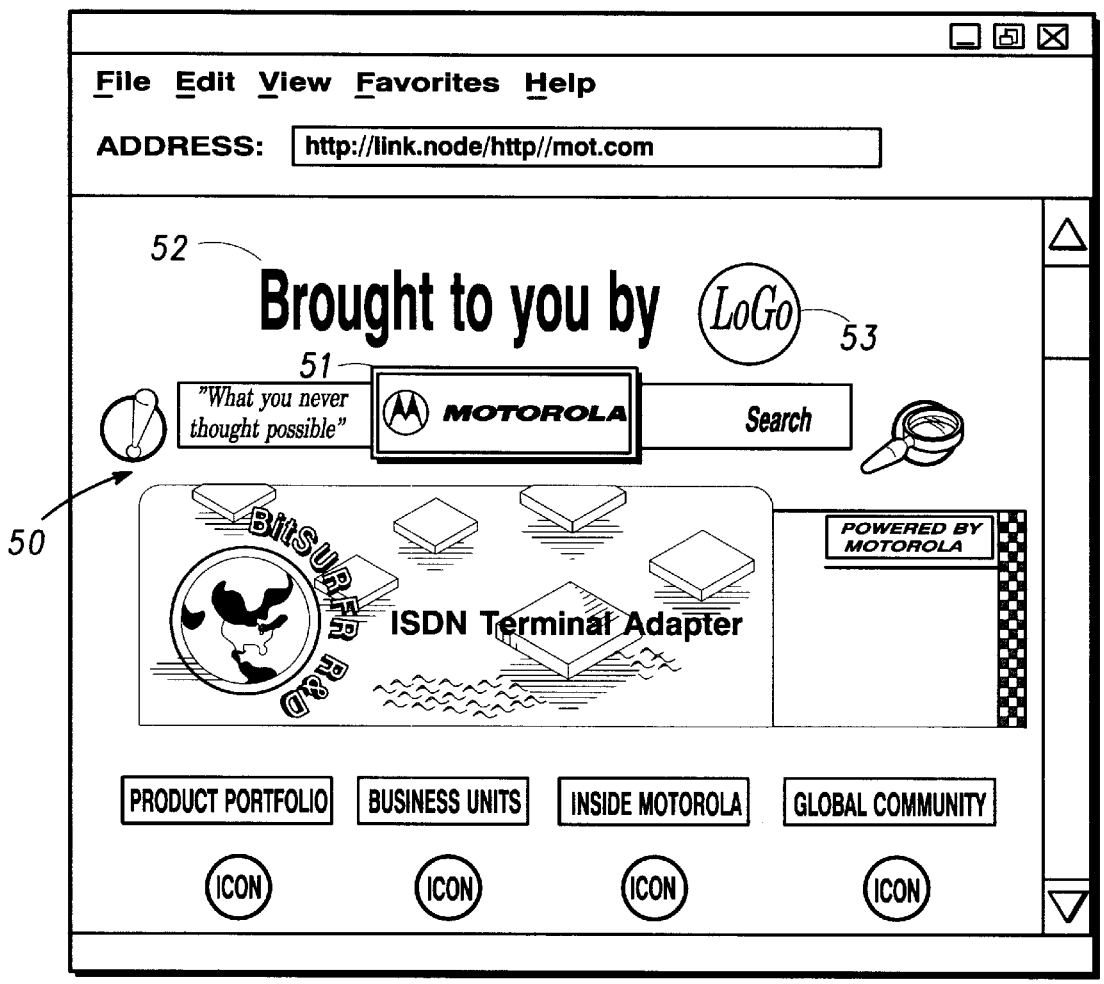
FIG. 3 is an illustration of an example display on a display device upon receiving a resource using the network navigation device of FIG. 2.

FIG. 3 is an illustration of an example display on the display device 32 upon receiving the resource using the network navigation device of FIG. 2. The display includes content 50 from the resource, which includes an image 51 corresponding to the first human-viewable image 42. The display further includes content 52 added by the linking service. The content 52 includes an image 53 corresponding to the second human-viewable image 44.

Figure 4:
FIG. 4 is an illustration of a second embodiment of a network navigation device in accordance with the present invention.

FIG. 4 is an illustration of a second embodiment of a network navigation device in accordance with the present invention. The network navigation device includes a substrate 54 which can be similarly sized and shaped, and formed of a similar material as the substrate 40 in FIG. 2. The substrate 54 supports machine-readable data 56 which provides a bar code representation of an IP address for the node providing a linking service node (in particular, a fictitious IP address of 256.256.256.256) and an IP address of the Discovery Channel's home page on the World Wide Web (in particular, 204.132.253.102).

The substrate 54 supports a first human-viewable image 58 which intuitively conveys to a user that the network navigation device is for linking to Discovery Channel Online. To reinforce the association between the network navigation device and the resource, the first human-viewable image 58 corresponds to an image which is viewable in the content of the Discovery Channel home page.

The substrate 54 also supports a second human-viewable image 59 which indicates the linking service which links the end user to the resource. As in the embodiment of FIG. 2, the second human-viewable image 59 includes a logo for the linking service.

The use of a printed image and printed data on a paper or cardboard substrate, such as in FIGS. 2 and 4, provides a number of advantages. A first advantage is that the resulting network navigation device can be produced inexpensively for wide distribution. For example, these network navigation devices can be: (i) included as inserts in magazines, newspapers, or other publications; (ii) stacked into decks and packaged for distribution by mail or for marketing in stores; and/or (iii) distributed as one distributes business cards. A second advantage is that a user can rapidly thumb through a number of network navigation devices to find network resources of interest by viewing the image on each network navigation device. In addition, the network navigation devices can be collected and traded in a manner similar to trading cards.

In addition, the use of a printed image and printed data allows for network navigation devices to be formed on pages of a book, magazine, newspaper, or other publication. In general, each page can define a single network navigation device, or can define a plurality of network navigation devices. If desired, a page defining a plurality of network navigation devices can be perforated to allow for separation into individual network navigation devices.

In one application, the printed image can include a figure in a book or the like. Here, the printed data may be utilized to link a user to a resource having information associated with the figure. If desired, the printed data can be included in a caption for the figure. In another application, a plurality of pages of network navigation devices are assembled to form a directory of resources in an electronic network.

Although the embodiments of FIGS. 2 and 4 illustrate a single printed code on the network navigation device, it is noted that separate printed codes can be utilized for each of the various types of information stored on a network navigation device.

Figure 5:
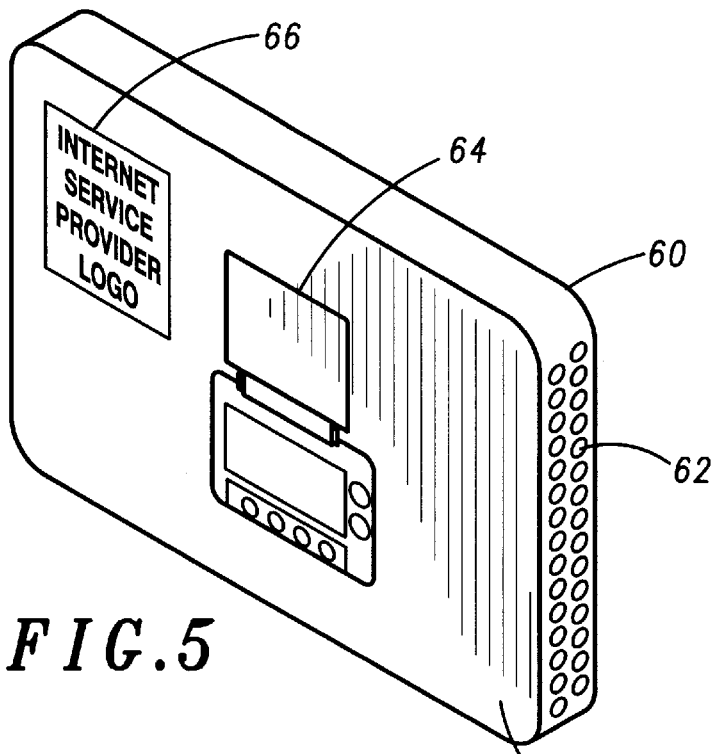
FIG. 5 illustrates a third embodiment of a network navigation device in accordance with the present invention.

FIG. 5 illustrates a third embodiment of a network navigation device in accordance with the present invention. The network navigation device includes a PCMCIA memory card 60 having stored therein machine-readable data representative of navigation instructions for linking to a resource. The PCMCIA memory card 60 has a PCMCIA interface 62 for communicating the machine-readable data to a data reader with a mating PCMCIA interface.

The PCMCIA memory card 60 supports a first externally-viewable image 64 and a second externally-viewable image 66 at an exterior surface 68. Hence, the substrate 12 as described earlier includes a portion of the housing of the PCMCIA memory card 60.

In this example, the first externally-viewable image 64 includes an image of a Tango™ two-way pager available from Motorola. The second externally-viewable image 66 includes a logo of a service provider, such as an internet service provider, through which access to the electronic network 20 is provided.

Machine-readable data in memory card 60 includes instructions for connecting to the internet service provider. The instructions for connecting can include, for example, a telecommunication number (such as a phone number) which is to be dialed to access the internet service provider. The machine-readable data can further include a code, such as a password, for authentication by the internet service provider. Based upon the code, access to the resource is either allowed, limited, or inhibited. Further, the code can be utilized by the internet service provider to uniquely identify the network navigation device.

In addition, the machine-readable data includes a representation of the URL for information on the Tango two-way pager on the World Wide Web, which is http://www.mot.com/MIMS/MSPG/Products/Two-way/tango/. The internet service provider utilizes the URL to link the end user 28 to the resource to receive information on the Tango™ two-way pager.

Figure 6:
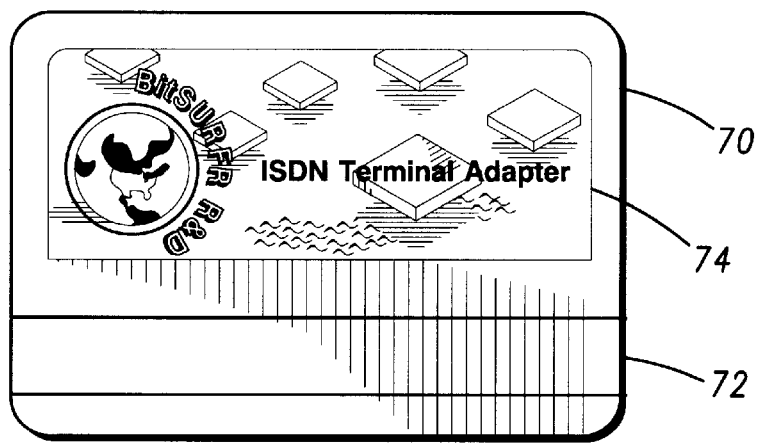
FIG. 6 illustrates a fourth embodiment of a network navigation device in accordance with the present invention.

FIG. 6 illustrates a fourth embodiment of a network navigation device in accordance with the present invention. The network navigation device includes a substrate 70 which supports a magnetic storage medium 72. In the example of FIG. 6, the magnetic storage medium 72 has the form of a magnetic stripe, although alternative forms can be utilized. The magnetic storage medium 72 stores machine-readable data providing navigation instructions for linking to a resource. The machine-readable data is communicated to a data reader having a magnetic reading head, such as a magnetic stripe reader.

The substrate 70 supports a human-viewable image 74 indicative of a resource for Motorola's BitSURFR™ modems. Accordingly, the magnetic storage medium 72 can store a representation of the URL for obtaining information on Motorola's BitSURFR™ modems, which is http://www.mot.com/MIMS/ISG/Products/bitsurfr_pro/.

In the embodiment illustrated in FIG. 6, the substrate 70 has the size of a credit card (3.375 inches by 2.25 inches). Preferably, the substrate 70 is formed entirely of a dielectric and/or nonmagnetic material such as paper, cardboard, or plastic. Here, the only magnetic material in the network navigation device is within the magnetic storage medium 72.

Figure 7:
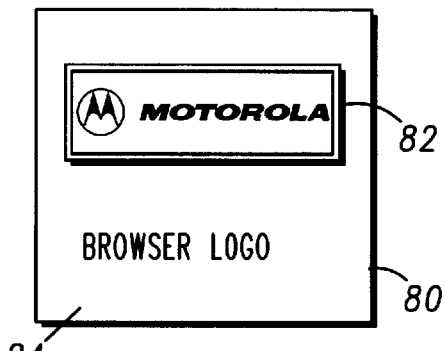
FIG. 7 illustrates a fifth embodiment of a network navigation device in accordance with the present invention.

FIG. 7 illustrates a fifth embodiment of a network navigation device in accordance with the present invention. The network navigation device includes a radio frequency tag 80 containing navigation instructions for accessing a resource. The radio frequency tag 80 includes a memory containing data representative of the navigation instructions, and a transmitter which transmits a signal representative of the data for external reception. The memory can be either read-only or read-write. In general, the radio frequency tag 80 can be either active (i.e. having an internal battery for powering its circuits) or passive (i.e. powering its circuits using externally-generated power).

Various commercially-available radio frequency tags can be utilized for the radio frequency tag 80, including but not limited to, tags produced by Indala Corporation and the MicroStamp RIC (Remote Intelligent Communication) tags available from Micron Communications, Inc. Illustrated in FIG. 7 is a network navigation device based on the MicroStamp RIC unit, which is postage-stamp sized (1.25 inches by 1.25 inches).

A human-viewable image 82 is supported by an exterior surface of the radio frequency tag 80. Hence, the substrate as described earlier includes a portion of the housing of the radio frequency tag 80. In this example, the human-viewable image 82 includes the Motorola logo, which indicates that the navigation instructions will link a user a resource which provides information about Motorola, Inc.

In this embodiment, the machine-readable data includes an electronic address for linking to a node (such as the node 24 in FIG. 1), and a code which identifies the resource to the node. The code may be used so that the electronic address for the resource is concealed from end users. The node converts the code to an electronic address for the resource, links to the electronic address, and communicates a content of the resource to the end user 28.

The machine-readable data further includes an instruction which initiates the execution of a predetermined Web browser for displaying the content of the resource. A logo for the predetermined Web browser is included in a second human-viewable image 84 supported by the exterior surface of the radio frequency tag 80.

Figure 8:
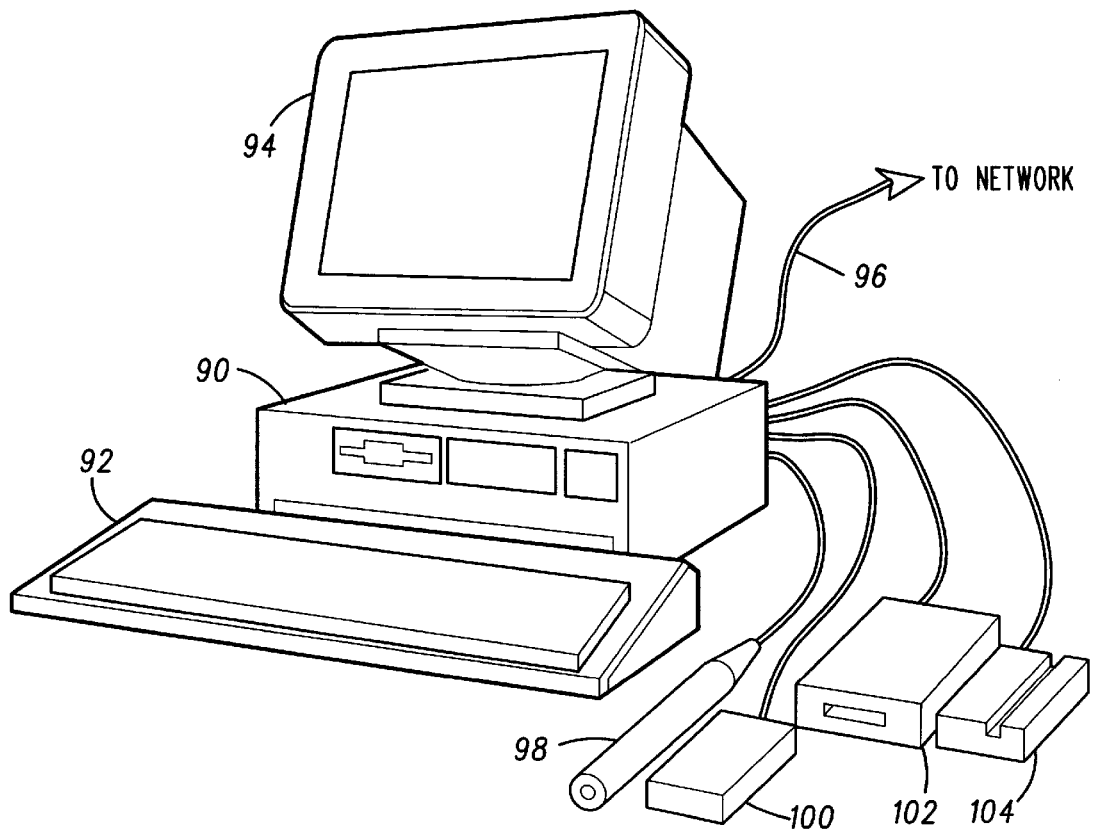
FIG. 8 illustrates an example of a network access apparatus and examples of various data readers for reading machine-readable data from a network navigation device.

FIG. 8 illustrates an example of a network access apparatus 22 and examples of various data readers for reading machine-readable data from a network navigation device. In this example, the network access apparatus includes a personal computer 90 having an input interface, such as a keyboard 92, and a display device, such as a monitor 94, coupled thereto.

The personal computer 90 communicates with an electronic network via a line 96, which can include a telephone line, an ISDN line, a cable television line, a fiber optic line, a computer network line, or the like. Alternatively, the personal computer 90 can wirelessly communicate with the electronic network 20. Based on the mode of communication with the electronic network 20, the personal computer 90 can include a modem and/or a transceiver to communicate with the electronic network 20. The electronic network 20 can be provided by an online service, an Internet service provider, a local area network service, a wide area network service, a cable television service, a wireless data service, an intranet, or the like.

The various data readers coupled to the personal computer 90 include a bar code reader 98, an RF tag reader 100, a PCMCIA card reader 102, and a magnetic stripe reader 104. The bar code reader 98 is utilized to read bar-coded navigation instructions from a network navigation device, such as those illustrated in FIGS. 2 and 4. The RF tag reader 100 is utilized to receive and decode an electromagnetic signal representative of the navigation instructions generated by an RF tag, such as one illustrated in FIG. 6. The PCMCIA card reader 102 interfaces with a PCMCIA card, such as one illustrated in FIG. 5, to read navigation instructions stored therein. The magnetic stripe reader 104 reads magnetically-stored navigation instructions stored by a magnetic stripe, such as one illustrated in FIG. 6.

It is noted that the bar code reader 98 is illustrative of any optical reading device which can be utilized. Similarly, the PCMCIA card reader 102 is illustrative of any memory card reader which can be utilized, and the magnetic stripe reader 104 is illustrative of any magnetic reading device which can be utilized.

Figure 9:
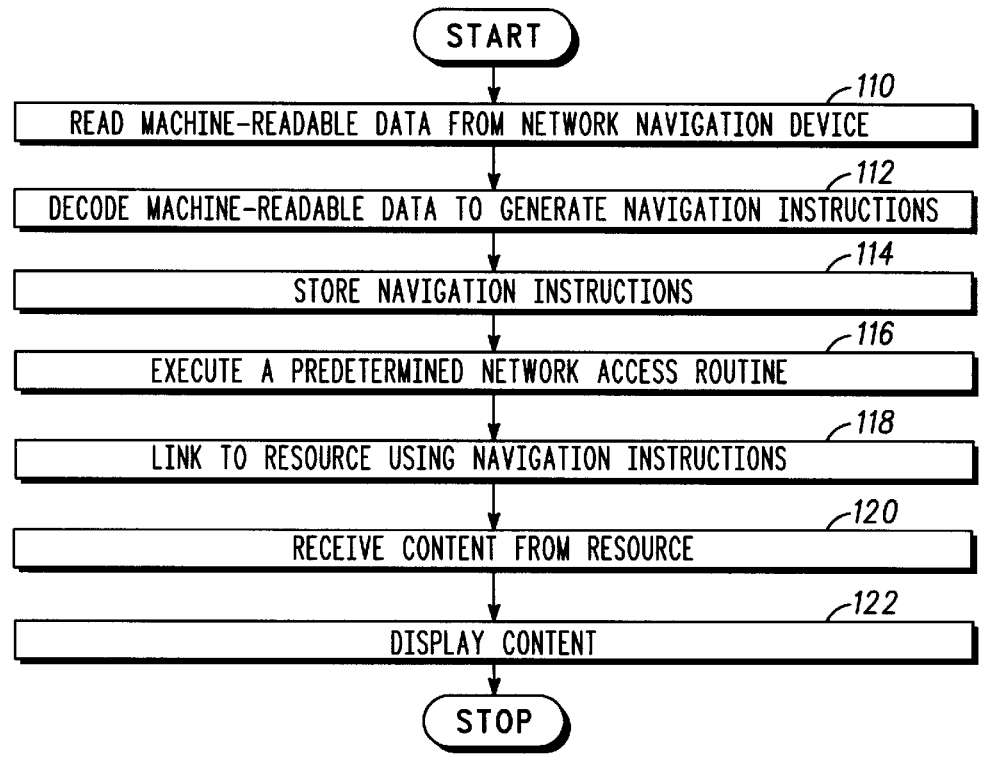
FIG. 9 is a flow chart of an embodiment of a method of linking to an electronic address in an electronic network.

FIG. 9 is a flow chart of an embodiment of a method of linking to a resource in an electronic network. The method can be utilized by the network access apparatus 22 in FIG. 1 to automatically link the end user 28 to a resource encoded on the network navigation device 10. Typically, the end user 28 selects a desired resource to visit based upon the first human-viewable image 14 associated therewith on the network navigation device 10.

As indicated by block 110, the method includes a step of reading machine-readable data from a network navigation device. The machine-readable data can be read using the data reader 30. The specific type of data reader utilized is selected based upon how the machine-readable data 16 is stored on the network navigation device 10.

As indicated by block 112, a step of decoding the machine-readable data 16 is performed to generate navigation instructions. The navigation instructions tell the network access apparatus 22 how to link to the resource. As described earlier, the navigation instructions can include at least a portion of a URL or at least a portion of an IP address for the resource. If a partial address is received, an additional step of completing the electronic address can be performed. For example, if an IP address is received, the IP address can be prepended by "http://".

It is noted that a URL can includes up to four parts: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet": for opening a telnet session; and "wais:" for accessing a WAIS server. Consequently, network navigation devices in accordance with the present invention can be utilized for automatically initiating any of the above tasks.

Optionally, a step of storing the navigation instructions is performed as indicated by block 114. The navigation instructions can be stored as a bookmark or stored in a favorites list, such as those available in many Web browsers, to provide a shortcut to the electronic address. Thereafter, a user can link to the resource by selecting the shortcut rather than having to re-read the navigation instructions from the network navigation device.

Preferably, a representation of the first human-viewable image 14 is stored to provide an iconic representation for the shortcut to the resource. As a result, the association between the first human-viewable image 14 and the resource is reinforced. Similarly, a representation of the second human-viewable image 18 can be stored for display with the iconic representation. This further reinforces the association between the second human-viewable image 18 and the service which provided the link to the resource.

To facilitate storing a representation of the human-viewable images 14 and 18, the machine-readable data 16 can include machine-readable data representative of the human-viewable images 14 and 18, which is read in block 110. Alternatively, the human-viewable images 14 and 18 can be optically scanned into the network access apparatus 22 using a page scanner or the like. As another alternative, an electronic representation of the first human-viewable image 14 can be downloaded from the resource, and an electronic representation of the second human-viewable image 18 can be downloaded from the service upon linking thereto.

As indicated by block 116, a step of executing a predetermined network access routine is performed. The step of executing the predetermined network access routine can include any of: (i) executing a routine to connect and/or to logon to a service provider (e.g. executing a dial-up routine or a wireless authentication routine to connect to a service provider); and (ii) executing a client routine for subsequent user interaction with the electronic address (e.g. executing a graphical user interface routine or a Web browsing routine).

The step of executing the predetermined network access routine can be executed prior to reading the machine-readable data in block 110. Alternatively, the predetermined network access routine can be automatically initiated upon reading the machine-readable data in block 110. Here, the machine-readable data 16 can include instructions for directing the initiation of the predetermined network access routine, and for directing which predetermined network access routine is to be executed.

In particular, the machine-readable data 16 can include instructions for directing the type and the specifics of the connection to be made to the electronic network 20. These instructions can dictate whether a wireline connection or a wireless connection should be made, and/or which wireline connection or which wireless connection should be made. As a result, the instructions on one network navigation device may direct a connection to a first service provider (e.g. America Online) while the instructions on another network navigation device direct a connection to a second service provider (e.g. CompuServe).

Further, the machine-readable data 16 can include instructions for selecting which client routine is to be executed. As a result, the instructions on one network navigation device may direct that a first graphical user interface routine (e.g. Netscape Navigator) be executed, while the instructions on another network navigation device direct a that second graphical user interface routine (e.g. Microsoft Internet Explorer) be executed.

As indicated by block 118, the method includes a step of linking to the resource using the navigation instructions. This step typically includes transmitting the navigation instructions to the electronic network 20 to establish the link to the resource.

As indicated by block 120, the method includes a step of receiving content from a resource once the link is established. The content from the resource can include audible information and/or visual information, such as graphical information and/or textual information. Examples of the content include, but are not limited to, any combination of a file from a local hard drive, a file from a FTP server, an HTML document, content from a Gopher server, a message from a newsgroup, a transmission from a Telnet session, a transmission from a WAIS server, an animation file, a movie file, and an audio file.

As indicated by block 122, the method includes a step of displaying the content from the resource. As described earlier, the content can include an image which corresponds to at least a portion of the first human-viewable image 14 on the network navigation device 10. Additionally, the content can include an image which corresponds to at least a portion of the second human-viewable image 18.

An article of manufacture can be formed to direct a network access apparatus to perform the above-described steps. The article of manufacture can include a computer-readable storage medium having computer-readable data stored therein which directs the network access apparatus to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Figure 10:
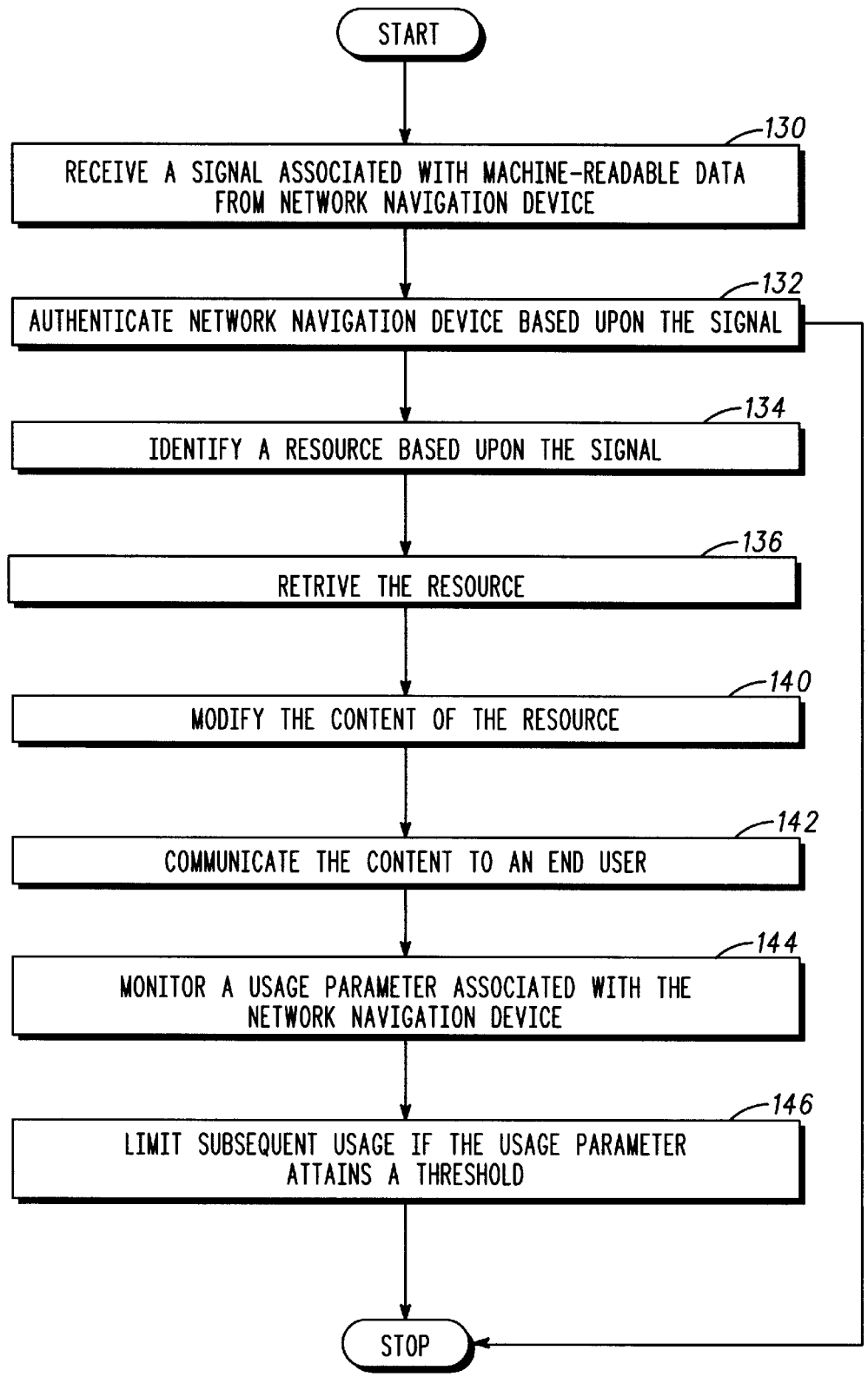
FIG. 10 is a flow chart of a method of providing a resource to an end user in an electronic network.

FIG. 10 is a flow chart of a method of providing a resource to an end user in an electronic network. The method can be utilized by the node 24 in FIG. 1 to provide the resource to the end user 28 who utilizes an embodiment of a network navigation device 10 in accordance with the present invention.

As indicated by block 130, the method includes a step of receiving a signal associated with machine-readable data read from a network navigation device. Typically, the machine-readable data is read by the end user using the data reader 30 shown in FIG. 1. The data reader 30 communicates a signal representative of the machine-readable data to the network access apparatus 22, which in turn, communicates a signal associated therewith to the node 24.

As indicated by block 132, an optional step of authenticating the network navigation device is performed. The network navigation device 10 is authenticated based upon the signal received in block 130. If the network navigation device 10 is successfully authenticated, then flow of the method is directed to block 134. If the network navigation device fails the step of authentication, then flow of the method is directed so as not to perform at least one, and typically all, of the subsequent steps.

As indicated by block 134, a step of identifying a resource based upon the signal is performed. The step of identifying the resource can include identifying an electronic address for the resource encoded in the signal. As described earlier, the electronic address can include at least a portion of a URL or at least a portion of an IP address. Alternatively, the step of identifying the resource can include identifying the resource based upon a code which is encoded in the signal. As described earlier, the code can be utilized to conceal the electronic address for the resource from the end user.

As indicated by block 136, a step of retrieving the resource is performed. The resource can be retrieved locally from a mass storage device at the node 24, or externally from another location in the electronic network 20, such as from the electronic address 26.

As indicated by block 140, the method optionally includes a step of modifying the content of the resource. Here, the content of the resource can be modified to include at least a portion of the second human-viewable image 18. As an example, the content of the resource can be modified to include a logo of a service being provided by the node 24.

As indicated by block 142, a step of communicating the content to the end user 28 is performed. This step can include communicating an image which corresponds to at least a portion of the first human-viewable image. Optionally, this step can include communicating an image which corresponds to at least a portion of the second human-viewable image.

As indicated by block 144, an optional step of monitoring a usage parameter associated with the network 5 navigation device is performed. The usage parameter can measure the usage in terms of: (i) units of time (e.g. minutes or hours); (ii) monetary units (e.g. dollars); or (iii) a number of uses.

As indicated by block 146, the method optionally 10 includes a step of limiting subsequent usage associated with the network navigation device once the usage parameter attains a predetermined threshold. Here, for example, subsequent usage can be limited if usage associated with the network navigation device reaches: (i) a predetermined time limit; (ii) a predetermined monetary limit; or (iii) a predetermined number of uses limit. Subsequent usage can be limited by either: (i) inhibiting or prohibiting all subsequent usage associated with the network navigation device; or (ii) allowing limited subsequent usage.

Figure 11:
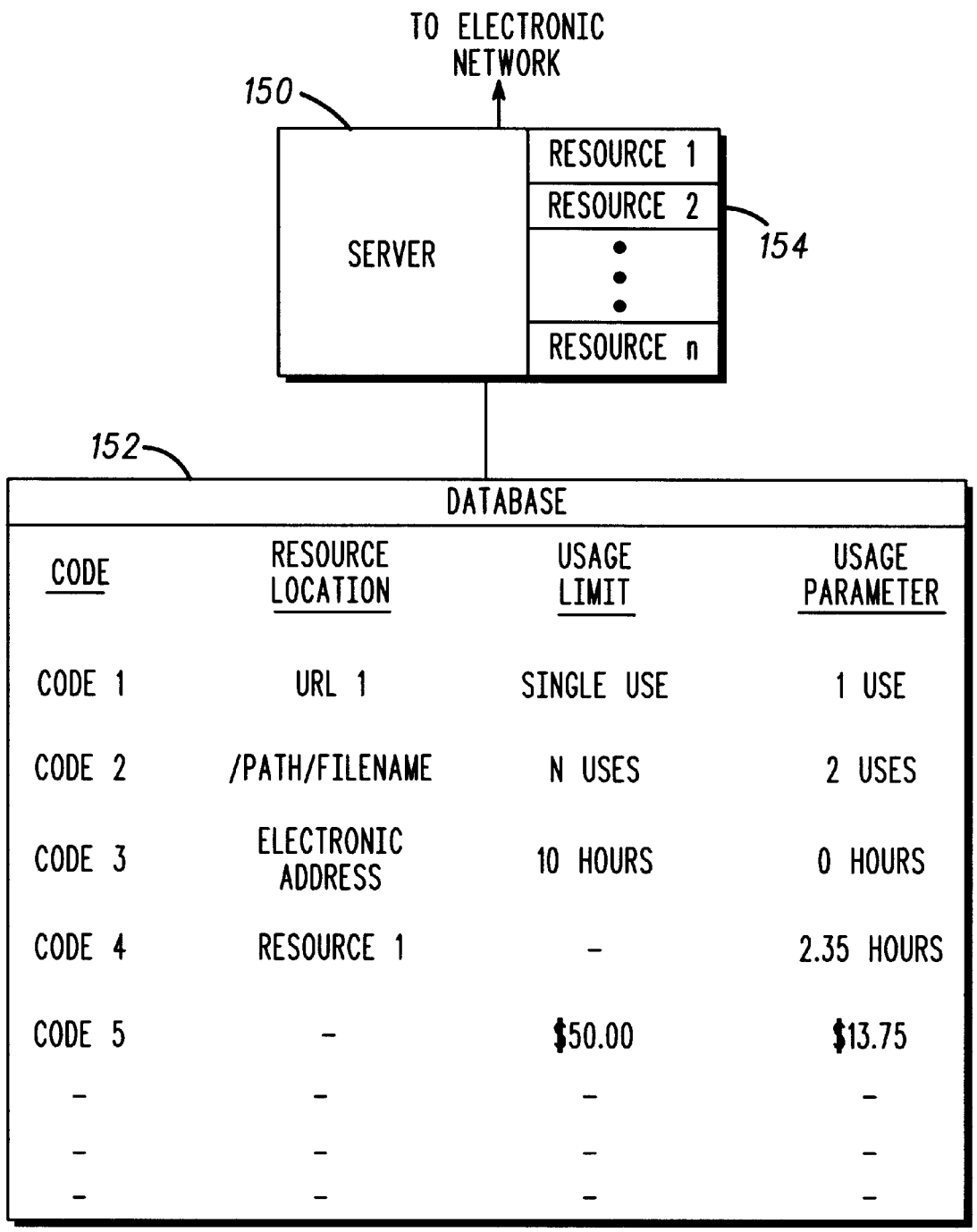
FIG. 11 is a block diagram of an embodiment of a node for providing a resource to an end user in an electronic network.

FIG. 11 is a block diagram of an embodiment of a node, such as node 24, for providing a resource to an end user in an electronic network. The node can be utilized to perform the steps described in conjunction with FIG. 10.

The node includes a server 150 which receives a signal associated with machine-readable data 16 read from a network navigation device 10. The server 150 receives the signal either from the electronic network 20 or from another communication link.

Based upon the signal, the server 150 is operative to authenticate the network navigation device 10 using a database 152. The database 152 includes a plurality of records corresponding to a plurality of network navigation devices. Each record includes a code which identifies a respective one of the network navigation devices. The server authenticates the network navigation device based upon a code encoded in the received signal. For example, authentication can occur if the code in the signal matches a code in the database 152.

Each record can additionally include a resource location, a usage limit, and a usage parameter. The resource location identifies a location of the resource associated with the network navigation device 10. As illustrated, the resource location can comprise an electronic address, a URL, an IP address, a /path/filename portion of a URL, or a name of a resource on the server. Alternatively, the resource location can indicate that no resource is specifically associated with the code.

The usage limit specifies a threshold of usage at which subsequent usage is limited. As illustrated, the usage limit can be gauged in terms of a number of uses, a time duration of usage, or a monetary measure. Alternatively, the usage limit can indicate that an unlimited use of the network navigation device is permitted.

The usage parameter indicates an amount of usage associated with the network navigation device. As illustrated, the usage parameter can be gauged in terms of a number of uses, a time duration of usage, or a monetary measure.

Upon authenticating the network navigation device 10, the server 150 identifies the resource to be provided to the end user 28 using the resource location field in the database 152. The server 150 retrieves the resource either from the electronic network 20 or locally from a plurality of resources 154. The plurality of resources 154 can include resources available elsewhere in the electronic network 20. Here, the server 150 with the plurality of resources 154 provides a mirror server. In addition, the plurality of resources 154 can include resources not available elsewhere in the electronic network 20.

The plurality of resources 154 can be selected to have content suited for a prespecified audience. For example, a subset of the plurality of resources 154 can specifically exclude material which is unsuitable for minors. Consequently, a network navigation device can be produced having limited access only to those resources in the plurality of resources 154 which are suitable for its predetermined audience.

The server 150 can modify the content of the resource to include a logo or the like which identifies a service provided thereby. Thereafter, the server 150 communicates the content of the resource to the end user 28.

As an alternative to retrieving and communicating the content of the resource, it is noted that the server 150 can simply initiate a hyperlink to connect the end user 28 to the resource.

The server 150 monitors a usage associated with the network navigation device 10 and accordingly updates the usage parameter in the database 152. Once the usage parameter attains the usage limit, the server 150 can limit subsequent usage.

It is noted that the database 152 can also record an amount of usage for each resource. An accounting report can be generated therewith to summarize the utilization of each resource provided by the node.

An article of manufacture can be formed to direct a node 24 to perform steps for providing a resource to an end user 28. The article of manufacture can include a computer-readable storage medium having computer-readable data stored therein which directs the network access apparatus 22 to perform the steps described herein.

Figure 12:
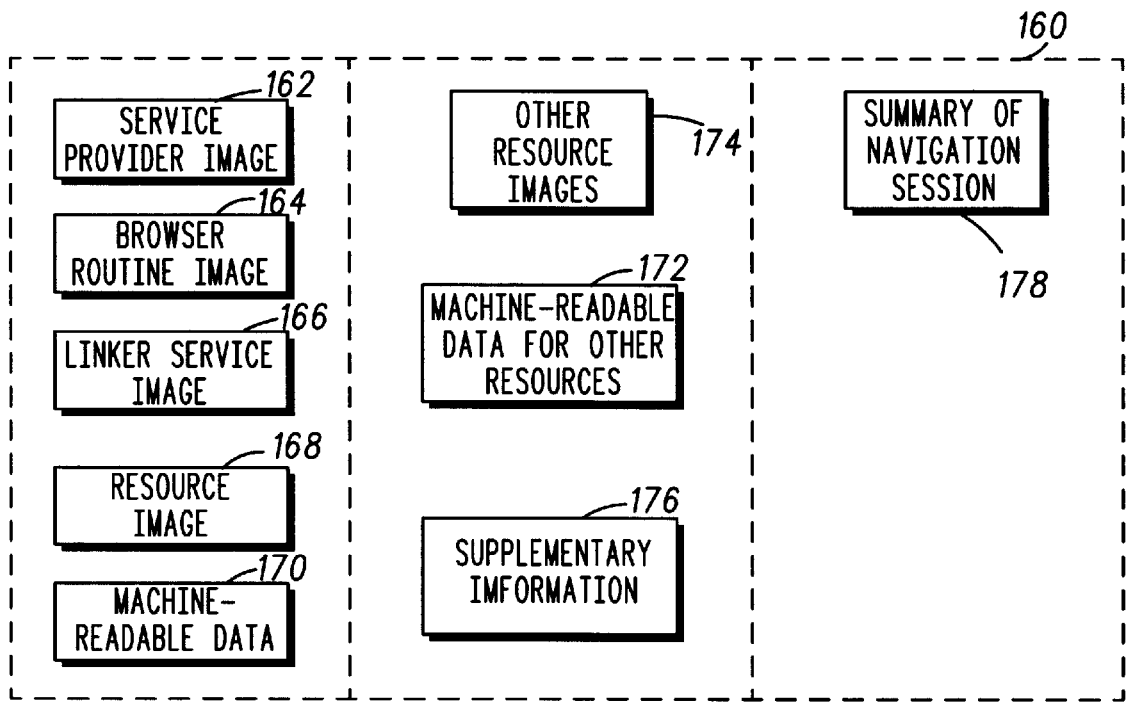
FIG. 12 is an illustration of a sixth embodiment of a network navigation device in accordance with the present invention.

FIG. 12 is an illustration of a sixth embodiment of a network navigation device in accordance with the present invention. The network navigation device includes a thin substrate 160 preferably formed of paper, cardboard, or plastic. The substrate 160 supports any combination of a service provider image 162, a browser routine image 164, a linker service image 166, a resource image 168, and machine-readable data 170. The machine-readable data 170 directs a network access apparatus to initiate a browser routine indicated by the browser routine image 164 to dial a service provider indicated by the service provider image 162. Thereafter, the machine-readable data 170 directs a linker service indicated by the linker service image 166 to retrieve a resource indicated by the resource image 168.

The substrate 160 further supports machine-readable data 172 for linking to other resources indicated by resource images 174. Additionally, the substrate 160 can support supplementary information 176 which describe the resources indicated by resource images 168 and 174. Further, the substrate 160 can provide space for printing a summary of the navigation session 178 using the hard copy device 38 in FIG. 1.

Figure 13:
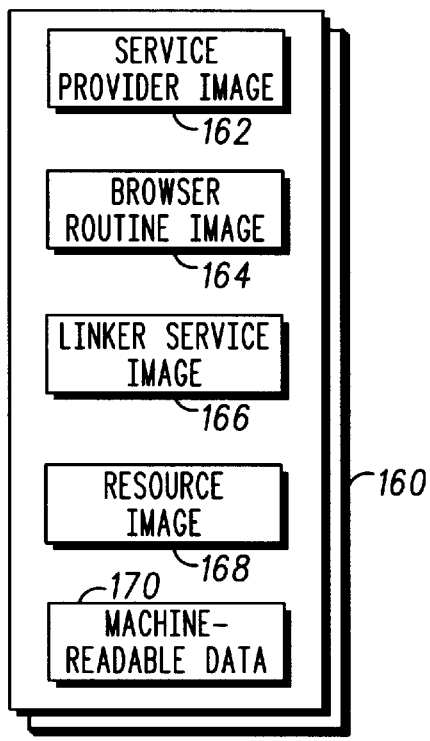
FIG. 13 is an illustration of the sixth embodiment in a folded state.

FIG. 13 is an illustration of the sixth embodiment in a folded state. In the folded state, only a subset of the above-described images, data, and information are externally accessible. Here, for example, only the service provider image 162, the browser routine image 164, the linker service image 168, and the machine-readable data 170 are externally accessible when the substrate 160 is folded.

Thus, there has been described herein several embodiments including preferred embodiments of methods and systems for providing a resource associated with a network navigation device.

Because the various embodiments of the present invention utilize a device having a human-viewable image which is intuitively associated with a resource at an electronic address and machine-readable data for linking to the electronic address, they provide a significant improvement in that the addressing format and the address itself may become transparent to the end user. Consequently, the problem of address complexity is addressed by using embodiments of the network navigation device. Further, the criticality of reserving desired domain names is reduced.

The intuitive association between the human-viewable image and the electronic address can be reinforced by including at least a portion of the human-viewable image within the content provided by the electronic address. Additionally, the device utilized in various embodiments of the present invention can include a second human-viewable image associated with a service which provides the resource to the end user. The service can augment the content of the resource to include at least a portion of the second human-viewable image to reinforce an association with the device.

Additionally, the various embodiments of the present invention as herein-described monitor a usage parameter associated with the network navigation device. Consequently, embodiments of the network navigation device can be utilized for prepaid, limited-use access of resources on an electronic network.

Further, the various embodiments of the present invention as herein-described automatically establish a connection to an electronic network and automatically execute a client routine upon reading the machine-readable data from the network navigation device. As a result, the process of initiating the connection (e.g. dialing a service provider and logging on) and executing the client routine (e.g. the Web browser) is also transparent to the user.

Still further, the various embodiments of the present invention as herein-described provide network navigation devices which can be inexpensively produced for wide distribution, are easy to handle for selecting electronic addresses of interest, can be collected and traded like trading cards, and can be disposed or discarded after use.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A system comprising:
   a network navigation device having a bar code, a first human-viewable image, and a second human-viewable image, the bar code encoding a first electronic address of a linking service of an internet and a second electronic address of a resource of the internet, the first human-viewable image being indicative of the resource, the second human-viewable image being indicative of the linking service;
   a bar code reader, in communication with a network navigation apparatus, to read the bar code;
   a node operative to link the network navigation apparatus to the linking service via the internet based upon the first electronic address encoded by the bar code and to link the linking service to the resource via the internet based upon the second electronic address encoded by the bar code, wherein the linking service receives content from the resource via the internet, the content including at least a portion of the first human-viewable image from the resource, and wherein the linking service modifies the content of the resource to include at least a portion of the second human-viewable image in addition to at least the portion of the first human-viewable image and to communicate the modified content from the linking service to an end user.

2. The system of claim 1 wherein the node includes a server which receives the signal.

3. The system of claim 2 wherein the node includes a database having a plurality of records corresponding to a plurality of network navigation devices, wherein the server is operative to authenticate the network navigation device using the database, wherein the network navigation device is authenticated independent of a data reader used to read the machine-readable data.

4. The system of claim 3 wherein the server monitors a usage associated with the network navigation device independent of a data reader used to read the machine-readable data and updates a corresponding usage parameter in the database.

5. The system of claim 4 wherein the server limits subsequent usage associated with the network navigation device once the usage parameter attains a predetermined threshold.

6. An article of manufacture comprising:
   a computer-readable storage medium; and
   computer-readable data stored on the computer-readable storage medium, the computer-readable data operative to direct at least one network navigation apparatus to read a bar code signal from a network navigation device, the network navigation device having the bar code, a first human-viewable image, and a second human-viewable image, the bar code encoding a first electronic address of a linking service of an internet and a second electronic address of a resource of the internet, the first human-viewable image being indicative of the resource, the second human-viewable image being indicative of the linking service;
   the computer-readable data operative to link the network navigation apparatus to the linking service via the internet based upon the first electronic address encoded by the bar code and to link the linking service to the resource via the internet based upon the second electronic address encoded by the bar code;
   the computer-readable medium operative to direct the linking service to receive content from the resource via the internet, the content including at least a portion of the first human-viewable image, and to direct the linking service to modify the content of the resource to include at least a portion of the second human-viewable image in addition to at least the portion of the first human-viewable image; and
   the computer-readable medium to communicate the modified content to an end user.

7. The article of manufacture of claim 6 wherein the computer-readable data further directs a step of authenticating the network navigation device based upon the signal, the network navigation device authenticated independently of a data reader used to read the machine-readable data.

8. The article of manufacture of claim 6 wherein the computer-readable data further directs a step of monitoring a usage parameter associated with the network navigation device, the usage parameter independent of a data reader used to read the machine-readable data.

9. The article of manufacture of claim 8 wherein the computer-readable data further directs a step of limiting subsequent usage associated with the network navigation device once the usage parameter attains a predetermined threshold.

10. A method comprising the steps of:
    providing a network navigation device having a bar code, a first human-viewable image, and a second human-viewable image, the bar code encoding a first electronic address of a linking service of an internet and a second electronic address of a resource of the internet, the first human-viewable image being indicative of the resource, the second human-viewable image being indicative of the linking service;
    reading the bar code using a bar code reader coupled to a network navigation apparatus;
    linking the network navigation apparatus to the linking service via the internet based upon the first electronic address encoded by the bar code;
    linking the linking service to the resource via the internet based upon the second electronic address encoded by the bar code;
    receiving, by the linking service, content from the resource via the internet, the content including at least a portion of the first human-viewable image;
    modifying, by the linking service, the content of the resource to include at least a portion of the second human-viewable image in addition to at least the portion of the first human-viewable image; and
    communicating the modified content from the linking service to the network navigation apparatus via the internet.

* * * * *

UNITED STATES PATENT AND TRADEMARK OFFICE
CERTIFICATE OF CORRECTION

| | | |
|---|---|---|
| PATENT NO. | : 5,995,105 | Page 1 of 1 |
| APPLICATION NO. | : 08/726004 | |
| DATED | : November 30, 1999 | |
| INVENTOR(S) | : Reber et al. | |

It is certified that error appears in the above-identified patent and that said Letters Patent is hereby corrected as shown below:

ON TITLE PAGE:

Please Insert:

-- Related U.S. Application Data:

(63)   Continuation-in-part of application No. 08/710,820, filed Sep. 23, 1996, now U.S. Pat. No. 5,940,595. --

Signed and Sealed this

Twentieth Day of February, 2007

JON W. DUDAS
*Director of the United States Patent and Trademark Office*